W. L. HENDRICKS.
TRACTOR.
APPLICATION FILED DEC. 17, 1918.
1,338,919.
Patented May 4, 1920.
3 SHEETS—SHEET 3.
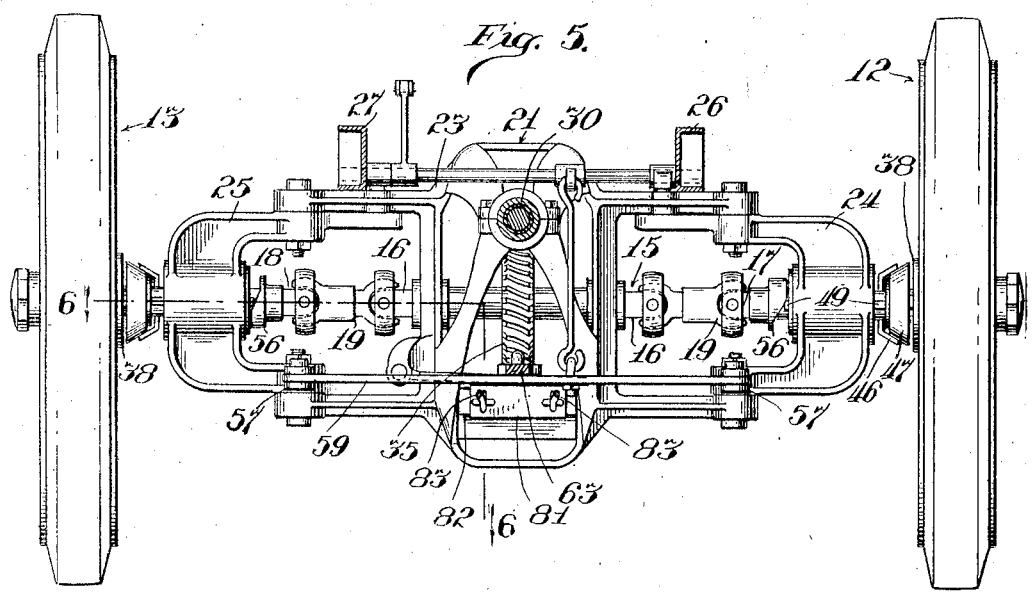
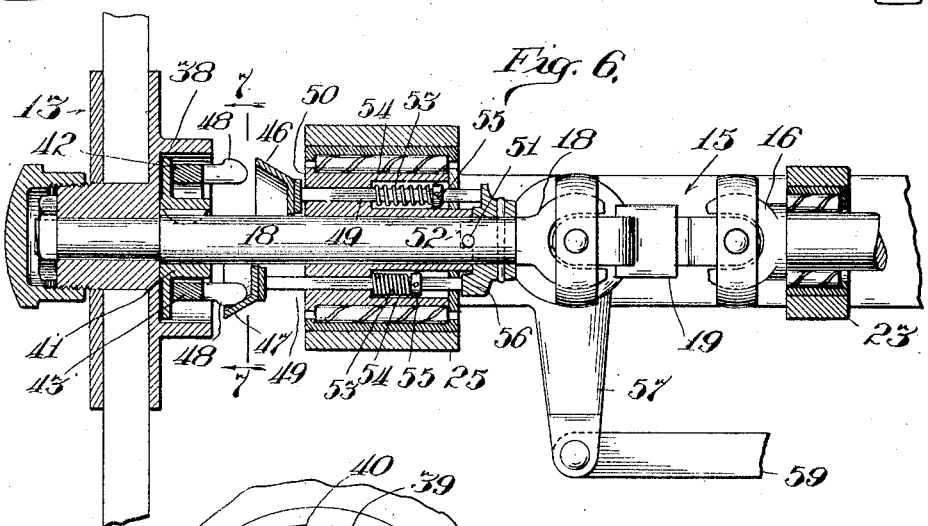
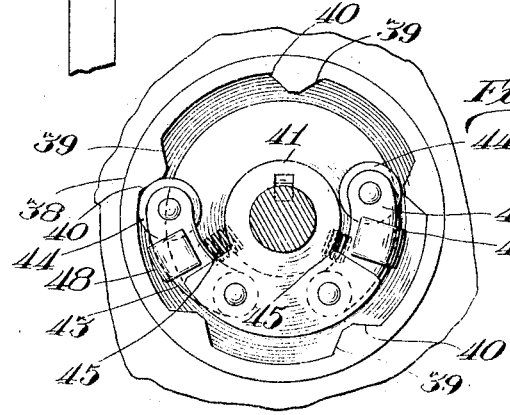
Inventor
Walter L. Hendricks
Gillson & Gillson
Attorneys.

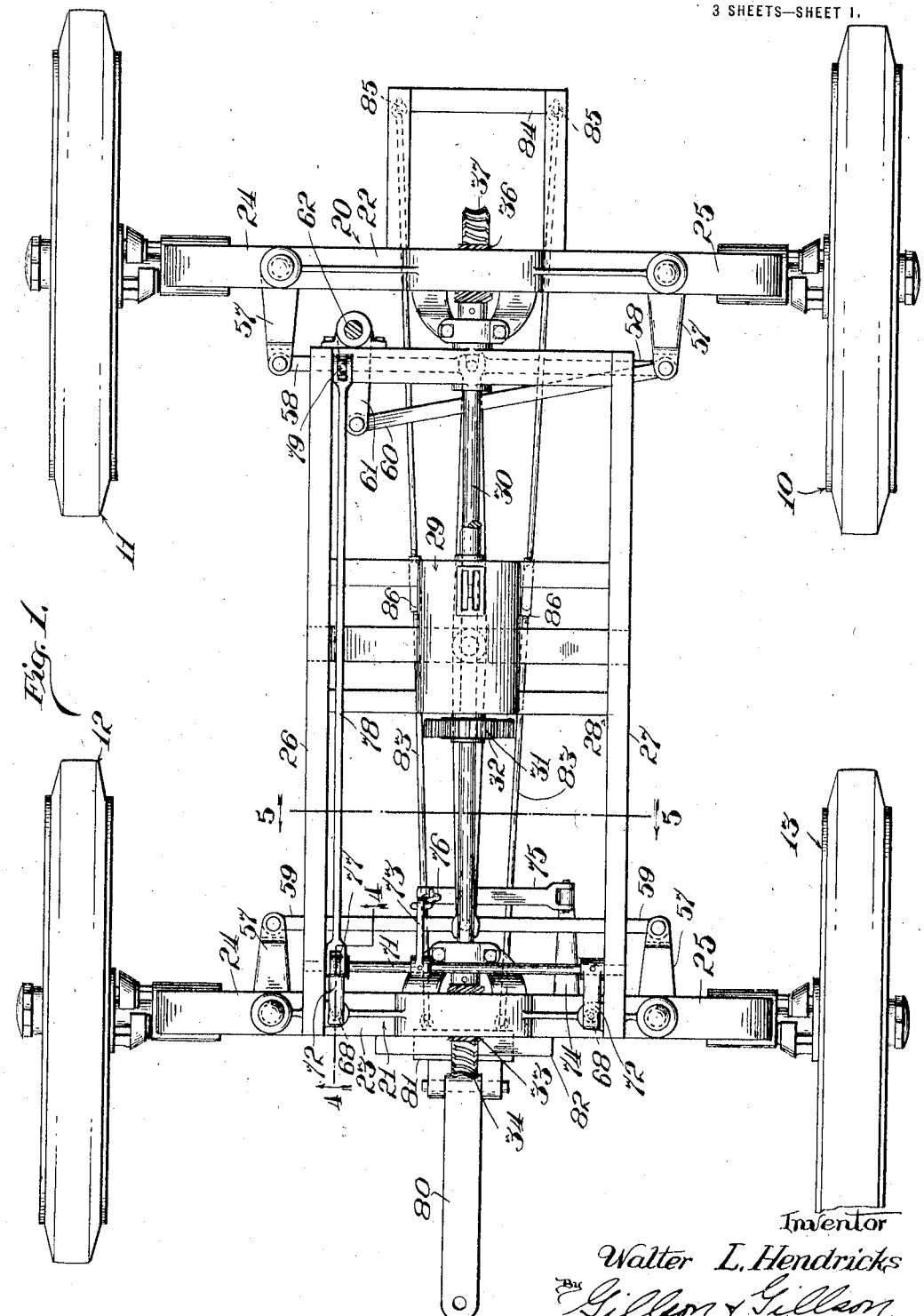

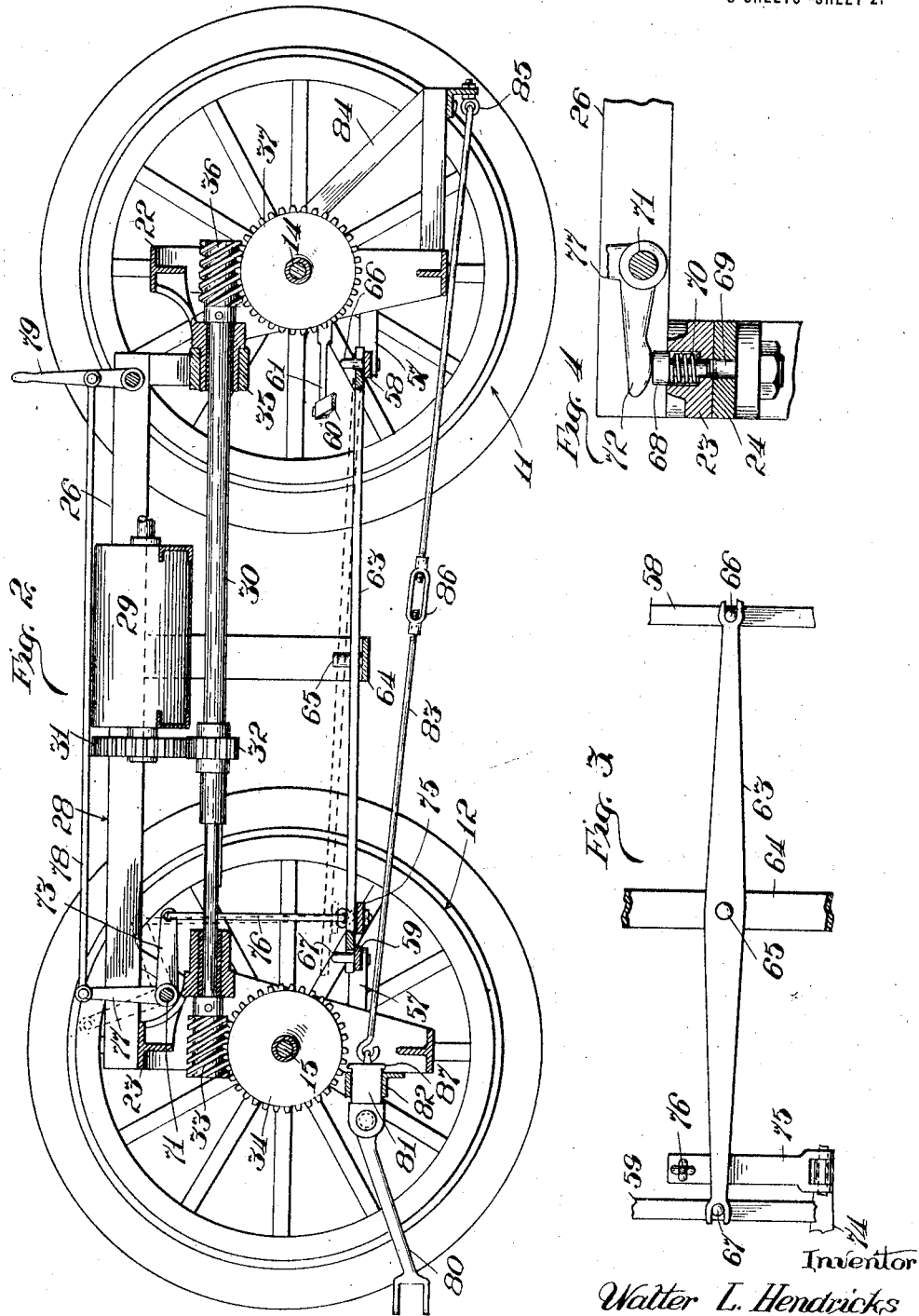

UNITED STATES PATENT OFFICE.

WALTER L. HENDRICKS, OF AURORA, ILLINOIS.

TRACTOR.

1,338,919.  Specification of Letters Patent.  Patented May 4, 1920.

Application filed December 17, 1918. Serial No. 267,145.

*To all whom it may concern:*

Be it known that I, WALTER L. HENDRICKS, a citizen of the United States, and resident of Aurora, county of Kane, and State of Illinois, have invented certain new and useful Improvements in Tractors, of which the following is a specification, and which are illustrated in the accompanying drawings, forming a part thereof.

The invention relates to motor vehicles and especially to tractors, although some features of the invention are applicable to motor vehicles of other types. The principal object of the invention is to provide an improved tractor which is of increased efficiency, but in the broader applications of the invention, the object is to improve the construction of motor vehicles generally.

As tractors do not usually carry the loads which are hauled, the weight of the load has not heretofore been ordinarily available for securing a firm engagement of the tractor wheels with the ground. Furthermore, while the capability of being turned about within relatively small compass is especially desirable in tractors and this capability is obtained in four wheeled vehicles of any type if provision is made for swinging all four of the wheels for steering, it not infrequently occurs in the use of any four wheeled vehicle, and especially tractors of that type, that the swinging of the rear wheels may be objectionable, as when a turn is to be made from a position close beside a fence or other obstruction. The invention accordingly contemplates an improved construction whereby the resistance to movement of the load serves to increase the pressure of the tractor wheels upon the ground and the use of the rear wheels in conjunction with the front wheels for steering, is optional.

In the accompanying drawings;—

Figure 1 is a plan view of a four wheeled tractor embodying the features of improvement provided by the invention, the motor and some of the accessories being omitted;

Fig. 2 is a central longitudinal sectional view of the tractor illustrated in Fig. 1, some of the parts being shown in elevation;

Fig. 3 is a detail plan sectional view, the plane of section being immediately below the plane of the propeller shaft;

Fig. 4 is a detail sectional view taken on the line 4—4 of Fig. 1;

Fig. 5 is a transverse sectional view taken on the line 5—5 of Fig. 1;

Fig. 6 is a detail plan sectional view taken on the line 6—6 of Fig. 5; and

Fig. 7 is a detail sectional view taken on the line 7—7 of Fig. 6.

The front and rear wheels of the tractor are indicated at 10, 11 and 12, 13, respectively. In the preferred construction, all four of these wheels are normally available for both driving and steering. For this purpose the front and rear axles, as 14 and 15, are desirably of the construction shown in Patent No. 1,239,484 on power truck for harvesters and the like, issued to me September 11, 1917. Under these circumstances, each axle, as 15 (Fig. 5), comprises intermediate and end sections 16, 17, 18, connected end to end, with universal joints, as 19. As in my said former patent, each axle 14, 15, is mounted in a sectional bolster 20, or 21, such bolster comprising an intermediate section 22 or 23 and swinging end sections 24, 25. The intermediate section 16 of each axle 14, 15, extends through and is journaled in the intermediate section 22 or 23 of the corresponding bolster 20 or 21 and the end sections 17 and 18 of each axle extend through and are journaled in the adjacent swinging bolster sections 24, 25.

In the construction illustrated, the intermediate section 23 of the rear bolster 21 is rigidly connected with the sills 26, 27, of a frame, generally designated 28. This frame carries the usual transmission, conventionally represented at 29, and the motor (not shown). The propeller shaft 30 extends centrally through the frame 28 from end to end. It receives power from the transmission 29 through a gear 31 and pinion 32. At its rear end the propeller shaft 30 extends through and is journaled in the intermediate section 23 of the rear bolster 21 and carries a worm 33 which has driving engagement with a worm wheel 34 mounted upon the intermediate section 16 of the rear axle 15. The forward end of the propeller shaft 30 extends through and is journaled in the front end sill, as 35, of the frame 28 and carries a worm 36 which has driving engagement with a worm wheel 37 on the front axle 14.

Preferably the bolster 20 is so connected to the frame 28 as to permit relative tilting movement between the front and rear axles 14, 15. As shown, the propeller shaft 30 extends through the intermediate section 22 of the bolster 20 and serves for pivotally connecting the front bolster 20 with the front end sill 35.

To provide for the transmission of power to all four of the tractor wheels, as 10, 11, 12 and 13, while still permitting the wheels at either side of the frame to turn in advance of those at the other side, when required, the end sections, as 17, 18, of the axles 14, 15, are preferably equipped with one of the forms of reversible ratchet mechanisms illustrated in my application for patent on power transmitting mechanism for motor vehicles, filed Dec. 17, 1918, Serial No. 267,144. In this construction the hub of each wheel, as 13, is preferably so formed as to provide a drum 38 having an annular series of oppositely facing instanding ratchet shoulders 39, 40 (Fig. 7). This drum and the corresponding wheel, as 13, are permitted to turn freely in advance of the axle, as 15, in the direction in which the axle is being driven at the time, but a pawl carrying hub 41 is fixed upon the adjacent axle section, as 18, within the drum 38. As shown, the pawl carrying hub 41 is equipped with two oppositely facing swinging pawl arms 42, 43, each carrying a roller pawl 44. The pawl arms 42 and 43 are advanced in alternation, as by springs 45 for coaction of the corresponding roller 44 with the ratchet shoulders 39 or 40, in accordance with the direction in which power is applied.

One or the other of the pawl arms 42, 43, of each set is held in operative position at all times, as by cams 46, 47. In the particular form of construction shown, the cams 46, 47, move in directions parallel to the axis of the corresponding axle section, as 18, and they coöperate with cam lugs 48 which project laterally from the corresponding pawl arms 42, 43. Provision is preferably made for moving the two cams 46, 47, in opposite directions whenever the direction of rotation of the corresponding axle section, as 18, is reversed. For this purpose each of the cams 46, 47, may be formed with a stem 49 which extends through and has longitudinal sliding movement in a bushing 50 (Fig. 6). To promote compactness of construction each bushing 50 is preferably employed as the means through which the corresponding axle section, as 18, is journaled in the adjacent bolster, as 25. The bushing 50 accordingly turns within the said bolster section and it has, in addition, a limited turning movement upon the axle. As shown, such movement is controlled by a pin 51 which is fixed in the axle and enters a slot or notch 52 and formed in the bushing 50 at one end of the same.

Movement of the stems 49 of the cams 46, 47, in one direction, is preferably controlled by springs, as 53. These springs may be coiled about the stems 49 within suitable sockets, as 54, formed in the bushing 50. They react between the inner ends of the said sockets and collars, as 55, which are fixed upon the stems 49. Movement of the cams 46, 47, in the other direction is accomplished by a plate cam 56. This plate cam is keyed to the corresponding axle section, as 18, immediately adjacent the inner end of the bushing 50. It reacts against the inner ends of the stems 49 upon relative turning movement between the bushing 50 and the axle. It will be understood that each time the direction of rotation of the axles 14, 15, is reversed the frictional resistance offered to the turning of the several bushings 50 in the new direction, provides for a relative turning movement between the bushings 50 and the axles to the extent permitted by the length of the slots 52. This movement effects a sufficient movement of the stems 49 of the cams 46, 47, over the plate cams 56 for shifting the two cams 46, 47, of each set.

Swinging movement is transmitted to each of the wheels 10, 11, 12, 13, for steering, by providing each of the swinging bolster sections 24, 25, with a crank arm or steering knuckle 57. As usual, the two steering knuckles 57 associated with the front and rear carrying wheels are connected by a link 58 or 59. Furthermore, a link 60 connects the steering knuckle 57, which is associated with one of the front carrying wheels, as 11, with a crank arm 61 of an upright steering post 62. While the steering post 62 is preferably mounted in the frame 28, the link 60 will be of sufficient length to accommodate itself to relative tilting movement between the frame 28 and the front bolster 22 if the steering post 62 is located near one side of the frame and the knuckle 57 to which the link is connected is located at the other side of the frame.

In order that the steering post 62 may be operative to swing the front and rear carrying wheels in opposite directions, the two links 58 and 59 are normally connected by a lever 63 which is fulcrumed intermediate its ends. As shown, the lever 63 is located at the mid-width of the machine and is normally supported in a stirrup 64 which hangs from the frame 28 centrally between the front and rear carrying wheels. The lever 63 is thus fulcrumed at its mid-length by providing the stirrup 64 with an upstanding stud 65 which passes through an aperture in the lever. The forward end of the lever 63 may be permanently connected with the link 58, as by a pivot pin 66, but the construction is preferably such as to permit disengagement of the lever 63 from the link 59. As shown, the link 59 is centrally formed with an upstanding stud 67 over which the lever 63 normally rests. Disengagement of the lever 63 from the link 59 is accordingly accomplished by lifting the lever out of engagement with the stud 67, as to the position indicated by dotted lines in Fig. 2. As shown, the engagement of the lever 63 with the pivot pin 66 and the fulcrum 65 is sufficiently loose for this purpose.

It is also desirable that the rear carrying wheels 12, 13, should be locked against swinging movement whenever the lever 63 is disengaged from the link 59. For this purpose a locking bolt 68 (Fig. 4) plays through the intermediate section 23 of the bolster 21, adjacent each end of the same, to enter an aperture 69 in the corresponding swinging bolster section, as 24, when depressed. Preferably each locking bolt 68 is normally elevated by a spring, as 70. As the rear wheels are to be held against swinging movement only when centrally positioned, each aperture 69 registers with the corresponding locking bolt 68 only when the swinging sections 24, 25, of the rear bolster 21 are alined with the intermediate section 23. At such times the two locking bolts 68 may be simultaneously depressed, as by the swinging of a rock shaft 71, which has a crank arm 72 for engagement with each of the said locking bolts. As shown, the rock shaft 71 extends between and is journaled in the two side sills 26, 27, of the frame 28 adjacent the rear bolster 21.

As the locking of the rear carrying wheels 12, 13 against swinging movement preferably occurs only in conjunction with the disengagement of the lever 63 from the link 59, the rock shaft 71 may be provided with a third crank arm 73 which serves for lifting the rear end of the lever 63 from the stud 67. As shown, a bracket 74 projects forwardly from the intermediate section 23 of the bolster 21, immediately below the plane normally occupied by the lever 63 and at the remote side of the said lever from the crank arm 73. A lifting bar 75 is pivotally connected with the forward end of the bracket 74 and extends under the lever 63, its free end being directly below the crank arm 73 to which it is connected by a link 76. Movement of the rock shaft 71 in the direction to depress the locking bolts 68 accordingly also serves for disconnecting the lever 63 from the link 59. To permit of these operations being controlled from a position adjacent the steering post 62 the rock shaft 71 may be provided with an upstanding crank arm 77, in which case a link 78 will preferably extend forwardly from the crank arm 77 to a controlling lever 79 mounted in the frame 28 near its forward end.

When power is transmitted to both the front and rear carrying wheels, as shown, it is desirable that the resistance of the load to movement, should be available for increasing the pressure of both front and rear wheels upon the ground. Furthermore, it is important in any case that the resistance of the load to movement should not be available for overturning the tractor by any tendency to lift the front end of the machine from the ground. In the construction shown the draw bar, as 80, is connected with a coupler head 81 which is carried by the intermediate section 23 of the rear bolster 21 but preferably with provision for relative longitudinal movement of the said coupler head. For this purpose the intermediate section 23 of the rear bolster 21 is formed with a socket 82 within which the coupler head 81 is slidingly mounted. Under these circumstances, a pair of draft links 83 are connected with the coupler head 81 and extend forwardly therefrom to the front end of the machine.

The arrangement will be most effective to increase the pressure of the front carrying wheels 10, 11, upon the ground if the forward ends of the draft links 83 are connected with the frame in front of and below the axle 14 (Fig. 2). For this purpose the intermediate section 22 of the front bolster 20 is formed with a downwardly and forwardly projecting frame 84 to which the draft links 83 are connected, as at 85 (Fig. 2). The draft links 83, coupler head 81 and draw bar 80 accordingly provide an arching draft member which extends longitudinally through the frame. The depressed forward end of the said draft member is connected with the frame in front of and below the level of the axis of the front carrying wheels and the elevated intermediate portion of the said draft member is supported at the rear end of the frame. The resistance to movement of the load is thereby effective to increase the pressure of both front and rear carrying wheels upon the ground. The resistance to movement of the load accordingly has no tendency to overturn the machine by raising its forward end and the power will always be effective through the ratchet drums 38 and pawl arms 42 or 43 to drive the machine in the desired direction.

In order that the position of the coupler head 81 in the socket 82 may be varied, the draft links 83 are preferably made adjustable in length, as by equipping each of these links with a turn buckle 86. In some cases it may also be desirable to limit rearward movement of the coupler head 81. For this purpose the said coupler head may be provided with a flange 87 at its forward end. It will thus be seen that by varying the length of the draft links 83 through the use of the turn buckles 85, the parts may be adjusted either for transmitting substantially all of the tractive effort from the front bolster 20 to the draft links 83 or for transmitting any portion or all of the tractive effort from the rear bolster 21 directly to the coupler head 81. In either of the last mentioned adjustments the flange 87 of the coupler head makes contact with the intermediate section 23 of the rear bolster 20 about the socket 82.

I claim as my invention:

1. In a tractor, in combination, a frame, power driven front and rear carrying wheels therefor, and an arching draft member connected at its forward end to the front end of the frame at a lower level than the axis of the said front carrying wheels and having, intermediate its ends, longitudinal sliding supporting engagement with the rear end of the frame above the level of the said forward end of the draft member, the said draft member being constructed at its rear end for connection with the load below the level at which the draft member has the said sliding supporting engagement with the rear end of the frame.

2. In a tractor, in combination, a frame, front and rear carrying wheels therefor, one of which sets of wheels is power driven, and an arching draft member having its forward end connected to the frame below and in front of the axis of the said front carrying wheels and having, intermediate its ends, longitudinal sliding supporting engagement with the frame adjacent the rear end of the frame above the level of the said connection of the forward end of the draft member with the frame, the said draft member being constructed at its rear end for connection with the load below the level at which the draft member has the said sliding supporting engagement with the frame.

3. In a tractor, in combination, a frame, front and rear carrying wheels therefor, one of which sets of wheels is power driven, and an arching draft member connected at its forward end to the front end of the frame at a lower level than the axis of the said front carrying wheels and having, intermediate its ends, longitudinal sliding supporting engagement with the rear end of the frame above the level of the said forward end of the draft member, the said draft member being constructed at its rear end for connection with the load below the level at which the draft member has the said sliding supporting engagement with the rear end of the frame.

4. In a tractor, in combination, a frame, front and rear carrying wheels therefor, one of which sets of wheels is power driven, and an arching draft member connected at its forward end to the front end of the frame below the level of the axis of the said front carrying wheels and being supported intermediate its ends upon the frame above the level of its said connection with the front end of the frame, the said draft member being constructed at its rear end for connection with the load below the level of its said intermediate support upon the frame.

5. In a tractor, in combination, a frame, front and rear carrying wheels therefor, one of which sets of wheels is power driven, and an arching draft member connected at its forward end to the frame below and in front of the axis of the said front carrying wheels and supported intermediate its ends upon the frame above the level of its said connection with the frame, the said draft member being constructed at its rear end for connection with the load below the level of its said intermediate support upon the frame.

6. In a tractor, in combination, a frame, front and rear carrying wheels therefor, one of which sets of wheels is power driven, and an arching draft member connected at its forward end to the frame below and in front of the axis of the said front carrying wheels and supported intermediate its ends upon the frame adjacent the rear end of the same above the level of its said connection with the frame, the said draft member being constructed at its rear end for connection with the load below the level of its said intermediate support upon the frame.

7. In a tractor, in combination, a frame, front and rear carrying wheels therefor, one of which sets of wheels is power driven, and an arching draft member connected at its forward end to the frame below and in front of the axis of the said front carrying wheels and having, intermediate its ends, longitudinally free supporting engagement with the frame adjacent the rear end of the same above the level of its said connection with the frame, the said draft member being constructed at its rear end for connection with the load below the level of its said supporting engagement with the frame.

8. In a tractor, in combination, a frame, front and rear carrying wheels therefor, one of which sets of carrying wheels is power driven, and an arching draft member having an elevated intermediate portion and depressed ends extending longitudinally through the frame and rearwardly beyond the same for connection with the load, the depressed forward end of the said draft member being connected to the frame adjacent its forward end below the level of the axis of the front carrying wheels and the elevated intermediate portion of the draft member being supported by the frame adjacent its rear end.

9. In a tractor, in combination, a frame, front and rear carrying wheels therefor, one of which sets of carrying wheels is power driven, and an arching draft member having an elevated intermediate portion and depressed ends extending longitudinally through the frame and rearwardly beyond the same for connection with the load, the depressed forward end of the said draft member being connected to the frame below and in front of the axis of the front carrying wheels, and the elevated intermediate portion of the draft member being supported by the frame adjacent its rear end.

10. In a tractor, in combination, a frame, front and rear carrying wheels therefor, one of which sets of carrying wheels is power driven, and a draft member extending longitudinally through the frame and having a relatively depressed rear end portion for connection with the load, the forward end of the said draft member being attached to the frame below and in front of the axis of the front carrying wheels, and the said draft member having an intermediate support upon the frame adjacent the rear end of the same.

WALTER L. HENDRICKS.